United States Patent
Krstic

(10) Patent No.: US 10,693,370 B1
(45) Date of Patent: Jun. 23, 2020

(54) SWITCHED-CAPACITOR CONVERTER WITH HIGH STEP-UP/STEP-DOWN CONVERSION RATIO

(71) Applicant: Marko Krstic, Kingston (CA)

(72) Inventor: Marko Krstic, Kingston (CA)

( * ) Notice: Subject to any disclaimer, the term of this patent is extended or adjusted under 35 U.S.C. 154(b) by 0 days.

(21) Appl. No.: 16/406,881

(22) Filed: May 8, 2019

(51) Int. Cl.
H02M 3/07 (2006.01)
H02M 1/00 (2006.01)

(52) U.S. Cl.
CPC ............... *H02M 3/07* (2013.01); *H02M 1/00* (2013.01)

(58) Field of Classification Search
None
See application file for complete search history.

(56) References Cited

U.S. PATENT DOCUMENTS

| | | | | |
|---|---|---|---|---|
| 7,705,560 | B2* | 4/2010 | Johnson | H02M 3/07 307/110 |
| 8,259,476 | B2* | 9/2012 | Ben-Yaakov | H02M 3/07 363/60 |
| 9,054,576 | B2* | 6/2015 | Kang | H02M 3/07 |
| 10,333,392 | B2* | 6/2019 | Low | H02M 3/073 |
| 2016/0344286 | A1* | 11/2016 | Barker | H02M 3/07 |
| 2018/0219477 | A1* | 8/2018 | Ji | G09G 3/36 |

* cited by examiner

*Primary Examiner* — Jeffrey A Gblende

(57) ABSTRACT

Structures and methods are provided for attaining high step-up and high step-down DC-to-DC power conversion using switched-capacitors. The DC-DC converters are comprised of a modular configuration of capacitors and switches and attain step-up ideal conversion ratios greater than $2^N$ and step-down ideal conversion ratios less than $1/2^N$, where N is the number of floating capacitors used by the converter. A method is provided for controlling the converters, wherein the control circuit generates a multiphase switching sequence which opens and closes the switches such that the converter cycles through a plurality of topological states. Sample switching sequences are provided to generate a set of attainable ideal conversion ratios for embodiments of the converters using three and four floating capacitors.

20 Claims, 10 Drawing Sheets

| Conversion Ratio | Phase | Switches ||||||||||
|---|---|---|---|---|---|---|---|---|---|---|---|
| | | A1 | A2 | A3 | B1 | B2 | B3 | C1 | C2 | D1 | D2 | Z |
| 10 | 1 | 1 | 0 | 0 | 0 | 1 | 0 | 0 | 0 | 1 | 0 | 0 |
| | 2 | 0 | 1 | 0 | 0 | 0 | 1 | 0 | 0 | 0 | 1 | 0 |
| | 3 | 0 | 0 | 1 | 1 | 0 | 0 | 1 | 0 | 0 | 1 | 0 |
| | 4 | 1 | 0 | 0 | 0 | 0 | 0 | 1 | 1 | 0 | 0 | 1 |
| 9 | 1 | 1 | 0 | 0 | 0 | 1 | 0 | 0 | 0 | 1 | 0 | 0 |
| | 2 | 0 | 1 | 0 | 0 | 0 | 1 | 0 | 0 | 0 | 1 | 0 |
| | 3 | 0 | 0 | 1 | 1 | 0 | 0 | 1 | 0 | 0 | 1 | 0 |
| | 4 | 0 | 0 | 0 | 1 | 0 | 0 | 1 | 1 | 0 | 0 | 1 |

| Conversion Ratio | Phase | Switches | | | | | | | | | | |
|---|---|---|---|---|---|---|---|---|---|---|---|---|
| | | A1 | A2 | A3 | B1 | B2 | B3 | C1 | C2 | D1 | D2 | Z |
| 1/10 | 1 | 1 | 0 | 0 | 0 | 1 | 0 | 0 | 0 | 1 | 0 | 0 |
| | 2 | 0 | 1 | 0 | 0 | 0 | 1 | 0 | 0 | 0 | 1 | 0 |
| | 3 | 0 | 0 | 1 | 1 | 0 | 0 | 1 | 0 | 0 | 1 | 0 |
| | 4 | 1 | 0 | 0 | 0 | 0 | 0 | 1 | 1 | 0 | 0 | 1 |
| 1/9 | 1 | 1 | 0 | 0 | 0 | 1 | 0 | 0 | 0 | 1 | 0 | 0 |
| | 2 | 0 | 1 | 0 | 0 | 0 | 1 | 0 | 0 | 0 | 1 | 0 |
| | 3 | 0 | 0 | 1 | 1 | 0 | 0 | 1 | 0 | 0 | 1 | 0 |
| | 4 | 0 | 0 | 0 | 1 | 0 | 0 | 1 | 1 | 0 | 0 | 1 |

| Conversion Ratio | Phase | Switches | | | | | | | | | | | | | |
|---|---|---|---|---|---|---|---|---|---|---|---|---|---|---|---|
| | | A1 | A2 | A4 | B1 | B2 | B3 | B4 | C1 | C2 | C3 | D1 | D2 | D3 | Z |
| 22 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 1 | 0 | 0 | 0 | 0 | 0 | 0 | 0 | 0 | 0 | 1 | 1 | 1 | 1 |
| 21 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 0 | 0 | 0 | 1 | 0 | 0 | 0 | 0 | 0 | 0 | 1 | 1 | 1 | 1 |
| 20 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 0 | 1 | 0 | 0 | 0 | 0 | 0 | 0 | 0 | 0 | 0 | 1 | 1 | 1 |

| Conversion Ratio | Phase | Switches | | | | | | | | | | | | | |
|---|---|---|---|---|---|---|---|---|---|---|---|---|---|---|---|
| | | A1 | A2 | A4 | B1 | B2 | B3 | B4 | C1 | C2 | C3 | D1 | D2 | D3 | Z |
| 1/22 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 1 | 0 | 0 | 0 | 0 | 0 | 0 | 0 | 0 | 0 | 1 | 1 | 1 | 1 |
| 1/21 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 0 | 0 | 0 | 1 | 0 | 0 | 0 | 0 | 0 | 0 | 1 | 1 | 1 | 1 |
| 1/20 | 1 | 1 | 0 | 0 | 0 | 1 | 0 | 0 | 1 | 0 | 0 | 0 | 0 | 0 | 0 |
| | 2 | 0 | 1 | 0 | 0 | 0 | 0 | 1 | 0 | 0 | 1 | 0 | 1 | 0 | 0 |
| | 3 | 0 | 0 | 1 | 1 | 0 | 0 | 0 | 0 | 0 | 1 | 1 | 1 | 0 | 0 |
| | 4 | 1 | 0 | 0 | 0 | 0 | 1 | 0 | 0 | 1 | 0 | 1 | 0 | 0 | 0 |
| | 5 | 0 | 1 | 0 | 0 | 0 | 0 | 0 | 0 | 0 | 0 | 0 | 1 | 1 | 1 |

SWITCHED-CAPACITOR CONVERTER WITH HIGH STEP-UP/STEP-DOWN CONVERSION RATIO

FIELD OF THE INVENTION

The present invention relates to DC-DC converters, and in particular switched-capacitor DC-DC converters.

BACKGROUND OF THE INVENTION

Switched-capacitor (SC) DC-DC converters are comprised of capacitors and switches and accomplish power conversion solely by charging and discharging capacitors. Due to their lack of magnetic elements, SC converters are commonly used in integrated implementations which require higher power density.

Switched-capacitor DC-DC convertors are capable of attaining high step-up and high step-down conversion ratios, an important requirement in many applications, including 48V-to-1V power conversion in telecommunications and data-center applications. Converters with high step-up and step-down ratios can eliminate the need for intermediate power conversion stages and additional intermediate bus converters, allowing for direct conversion from source to load. This approach can improve overall conversion efficiency and power density and reduce system cost and size.

The ideal, unloaded conversion ratio, $M_i$, of a switched-capacitor DC-DC converter is entirely determined by its switching structure. The maximum and minimum attainable ideal conversion ratio of a switched-capacitor converter has been shown to be a function of the number of capacitors. SC converters using an increased number of capacitors are therefore capable of attaining higher step-down and higher step-up conversion ratios.

While a large number of active devices can be integrated in a small area using modern CMOS processes, current integrated capacitors typically achieve densities of 0.1-10 nF/mm$^2$. This low capacitive density significantly increases the size of the converter and thus its cost. In addition, integrated capacitors exhibit high parasitic bottom-plate capacitances, degrading the efficiency and performance. Accordingly, the number of capacitors used by the converter should be minimized to the greatest extent possible.

A number of switched-capacitor DC-DC converters with high step-up and high step-down conversion ratios have been proposed. These include those found in U.S. Pat. No. 6,198,645 issued to National Semiconductor Corporation on Mar. 6, 2001, U.S. Pat. No. 8,259,476 issued to Ben-Yaakov et al on Jul. 29, 2009, U.S. Pat. No. 8,693,224 issued to pSemi Corporation on Apr. 8, 2014, and U.S. Pat. No. 8,817,501 issued to pSemi Corporation on Aug. 26, 2014. These prior converters, however, cannot generate ideal conversion ratios greater than $M_i=2^N$ or less than $M_i=1/2^N$, where N is the number of capacitors used by the converter.

SUMMARY

According to aspects of the present invention, structures and methods are provided for achieving high step-up and high step-down DC to DC power conversion using switched-capacitors. The converters are comprised of a plurality of capacitors and a plurality of switches which are arranged in a manner to maximize the step-up and step-down ideal conversion ratios for the given number of capacitors. These converters can attain step-up ideal conversion ratios greater than $2^N$ and step-down ideal conversion ratios less than $1/2^N$, where N is the number of floating capacitors used by the converter.

A method is provided for controlling the converter, where the switches are opened and closed, such that the converter cycles through a plurality of topological states. Sample switching sequences are provided to generate a set of attainable ideal conversion ratios for embodiments of the converters using three and four floating capacitors. The converters can attain an ideal conversion ratio of 10 and 1/10 when using three floating capacitors and can attain an ideal conversion ratio of 22 and 1/22 when using four floating capacitors. The converters are also capable of dynamically varying their ideal conversion gain during operation.

The converter is composed of one or more modules, with each module corresponding to a single floating capacitor in the circuit. In some embodiments, where higher step-up or higher step-down ideal conversion ratios are required, more modules, and thus more floating capacitors, can be used.

A more complete appreciation of the present invention and its improvements can be obtained by reference to the accompanying drawings, which are briefly summarized below, to the following detailed description of the invention, and to the appended claims.

BRIEF DESCRIPTION OF DRAWINGS

To better understand the invention, and to show more clearly how it may be carried into effect, embodiments will be described, by way of example, with reference to the accompanying drawings, wherein.

DETAILED DESCRIPTION OF EMBODIMENTS

Figure 1:
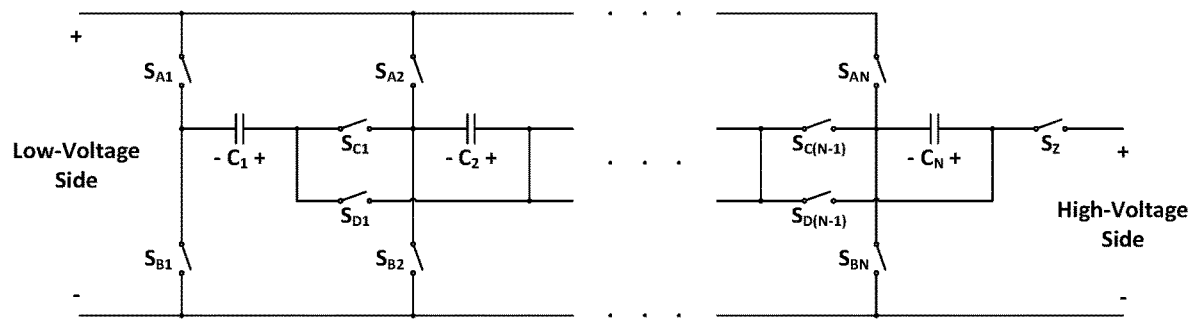
FIG. 1 is an embodiment of the generalized structure of the switched-capacitor DC-DC converter of the present invention.

The generalized structure of one embodiment of the switched-capacitor DC-DC converter of the present invention is depicted in FIG. 1. The converter has a low-voltage side, with a positive terminal and a negative terminal, and a high-voltage side, with a positive terminal and a negative terminal. The converter is modular and comprised of N floating capacitors, where N is at least three. The low-voltage terminals of the converter are typically connected to at least one additional capacitor and the high-voltage terminals are typically connected to at least one additional capacitor. The converter is comprised of a plurality of switches which are connected to the $n^{th}$ floating capacitor, where n is a natural number between 1 and N. Switch $S_{An}$ connects the negative terminal, or bottom plate, of capacitor $C_n$ to the positive terminal of the low-voltage side. Switch $S_{Bn}$ connects the negative terminal, or bottom plate, of capacitor $C_n$ to the negative terminal of the low-voltage side and the negative terminal of the high-voltage side. Each $n^{th}$ floating capacitor is connected to the $(n+1)^{th}$ adjacent capacitor using two switches, where n is a natural number less than N. Switch $S_{Cn}$ connects the positive terminal, or top plate, of capacitor $C_n$ to the negative terminal, or bottom plate, of capacitor $C_{n+1}$ and switch $S_{Dn}$ connects the positive terminal, or top plate, of capacitor $C_n$ to the positive terminal, or top plate, of capacitor $C_{n+1}$. Switch $S_Z$ connects the positive terminal, or top plate, of the $N^{th}$ capacitor, $C_N$, to the positive terminal of the high voltage side. The converter is therefore modular, with each module corresponding to a single floating capacitor in the circuit.

In another embodiment of the generalized structure of the switched-capacitor DC-DC converter of the present invention, switches $S_{A1}$, $S_{A2}$, and $S_{AN}$ connect the positive input terminal of the low-voltage side to the negative terminal of the first, second, and $N^{th}$ capacitor respectively. The remaining switches, including switches $S_{Bn}$, $S_{Cn}$, $S_{Dn}$, and $S_Z$, are configured in the same manner as the previously described embodiment. Thus, switch $S_{Bn}$ connects the negative terminal of capacitor $C_n$ to the negative terminal of the low-voltage side and the negative terminal of the high-voltage side. Switch $S_{Cn}$ connects the positive terminal of capacitor $C_n$ to the negative terminal of capacitor $C_{n+1}$. $S_{Dn}$ connects the positive terminal of capacitor $C_n$ to the positive terminal of capacitor $C_{n+1}$. Switch $S_Z$ connects the positive terminal of the $N^{th}$ capacitor, $C_N$, to the positive terminal of the high voltage side.

Figure 2:
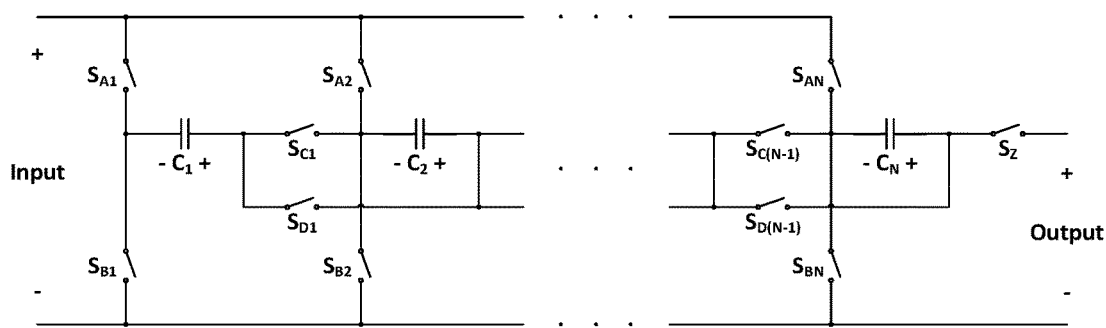
FIG. 2 is an embodiment of the generalized structure of the high step-up conversion ratio switched-capacitor DC-DC converter of the present invention.

The switched-capacitor converter of the present invention is capable of attaining high step-up conversion ratios and high step-down conversion ratios. The generalized structure of one embodiment of the high step-up ratio switched-capacitor DC-DC converter of the present invention is depicted in FIG. 2. The step-up converter is based on the generalized structure of FIG. 1 where the low-voltage side is the input of the converter and the high-voltage side is the output. The low-voltage side terminals are then connected to an input energy source and the high-voltage terminals are connected to an output load. The input of the converter is typically connected to at least one additional input capacitor and the output of the converter is typically connected to at least one additional output capacitor.

Figure 3:
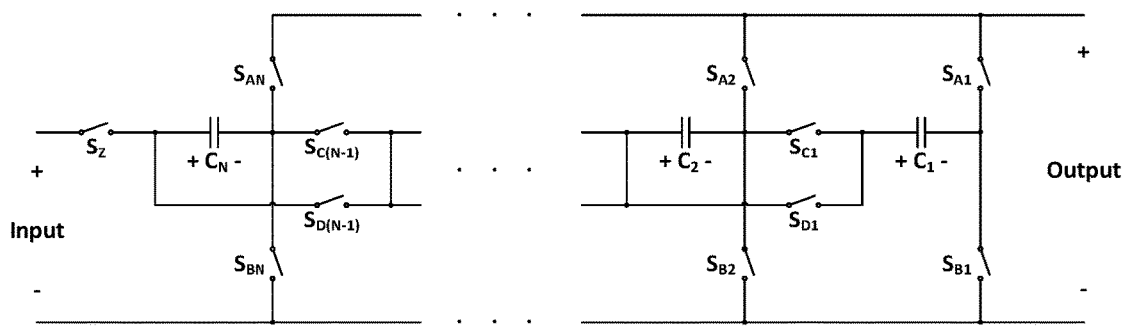
FIG. 3 is an embodiment of the generalized structure of the high step-down conversion ratio switched-capacitor DC-DC converter of the present invention.

The generalized structure of one embodiment of the high step-down ratio switched-capacitor DC-DC converter of the present invention is depicted in FIG. 3. The step-down converter is also based on the generalized structure of FIG. 1 but, in this case, the high-voltage side is the input of the converter and the low-voltage side is the output. The high-voltage side terminals are then connected to an input energy source and the low-voltage terminals are connected to an output load. The input of the converter is typically connected to at least one additional input capacitor and the output of the converter is typically connected to at least one additional output capacitor. It is evident that both the step-up and step-down converters can share an identical structure, as illustrated by the embodiments in FIG. 2 and FIG. 3, except that the input terminals and output terminals are interchanged between them.

Figure 4:
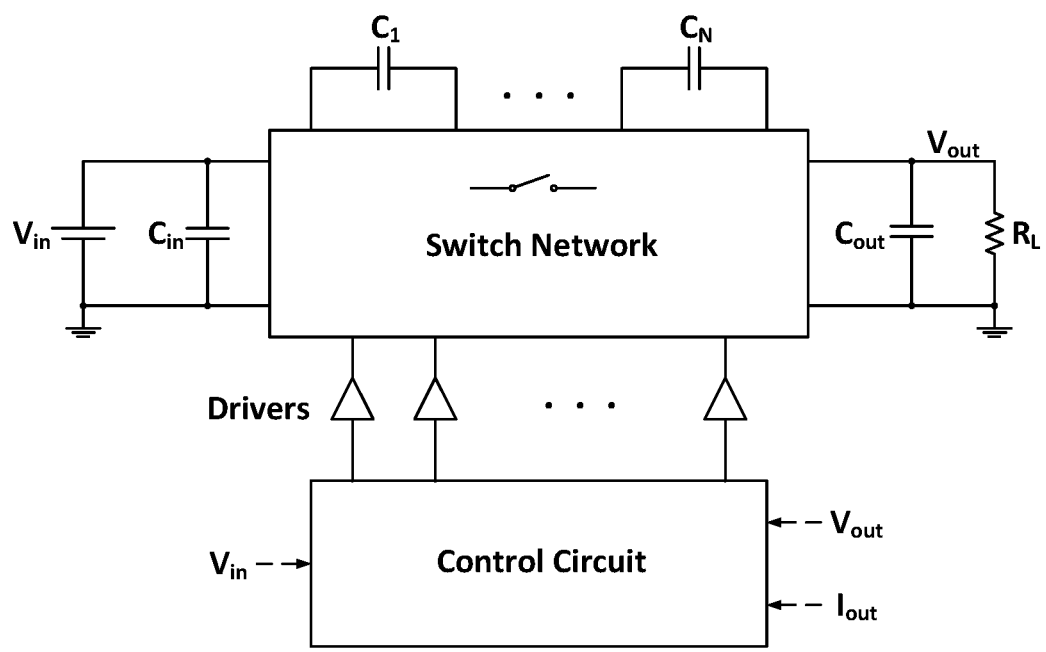
FIG. 4 is a system-level block diagram of a switched-capacitor converter.

A system level block diagram of a generalized converter is shown in FIG. 4. The control circuit opens and closes the plurality of switches in such a manner that the converter cycles through P distinct topological configurations, or phases, where P≥2. By operating the SC converter using a multiphase control strategy, the converter is capable of generating very high step-up and very high step-down conversion ratios for the given number of capacitors. These conversion ratios, $M_i$, can be greater than $2^N$ ($M_i > 2^N$) or less than $1/2^N$ ($M_i < 1/2^N$, where N is the number of floating capacitors used by the converter. The converter achieves the highest step-up and highest step-down conversion ratios when the number of phases is P=N+1. The step-up and step-down ratio can also be increased by using an increased number of capacitors.

Figures 5, 6:
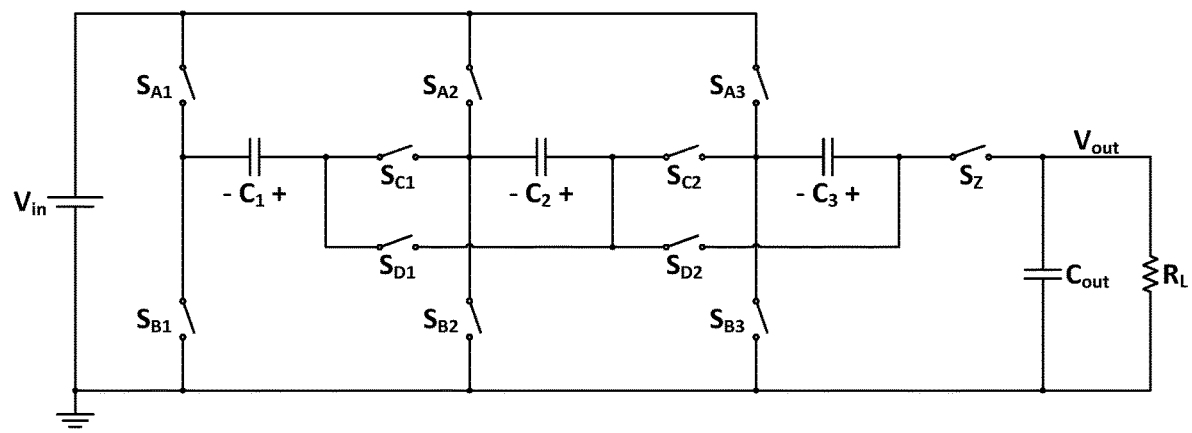
FIG. 5 is a circuit diagram of an embodiment of the high step-up ratio switched-capacitor DC-DC converter of the present invention utilizing three floating capacitors.
FIG. 6 is a table which lists the switching sequences for a set of attainable ideal conversion ratios for the converter in FIG. 5.
Figure 7A:
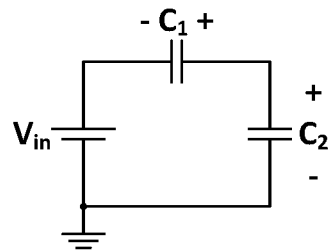
FIG. 7A through 7D show the topological switching states corresponding to the ideal conversion 10 for the converter in FIG. 5.
Figure 7B:
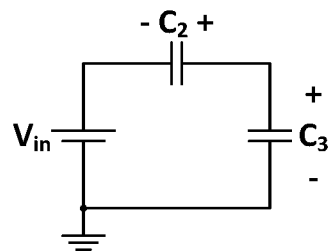
Figure 7C:
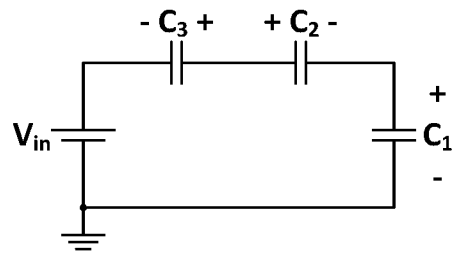
Figure 7D:
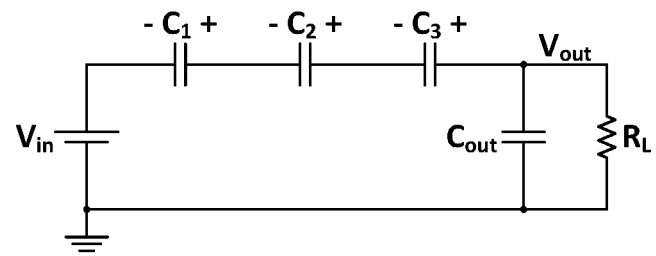

An embodiment of the high step-up ratio switched-capacitor DC-DC converter of the present invention, utilizing three floating capacitors and eleven switches is shown in FIG. 5. In this embodiment, the low-voltage terminals are connected to an input voltage source, $V_{in}$, and the high-voltage terminals are connected to an output capacitor, $C_{out}$, and an output load, $R_L$. The converter is capable of attaining a number of different ideal conversion ratios which can be enumerated according to their corresponding switching sequence. The switching sequence defines which switches are turned on for each phase to generate the specified ideal conversion ratio. The results are summarized in FIG. 6, for conversion ratios 9 and 10, where '1' indicates that the switch is closed for that phase while '0' indicates that the switch is open. Thus, for conversion ratio 10, switches $S_{A1}$, $S_{B2}$ and $S_{D1}$ are turned on during phase one, switches $S_{A2}$, $S_{B3}$, and $S_{D2}$ are turned on during phase two, switches $S_{A3}$, $S_{B1}$, $S_{C1}$, and $S_{D2}$ are turned on for phase three, and switches $S_{A1}$, $S_{C1}$, $S_{C2}$, and $S_Z$ are turned on during phase four. The switching sequence for conversion ratio 9 is identical to that of conversion ratio 10 except during phase four, where switch $S_{B1}$ is turned on instead of switch $S_{A1}$.

The topological switching states corresponding to the ideal conversion ratio of 10, for phase one through four, are illustrated in FIG. 7A through 7D. During phase one, the input voltage source and capacitor $C_1$ are connected in series and charge capacitor $C_2$. During phase two, the input voltage source and capacitor $C_2$ are connected in series and charge capacitor $C_3$. For phase three, the input voltage source and capacitor $C_3$ are connected in series and charge capacitors $C_1$ and $C_2$. During the fourth phase, all floating capacitors are connected in series with the input voltage source and charge the output. If the converter is unloaded, the ideal capacitor voltages for this switching configuration are $$V_C = \begin{bmatrix} V_{C_1} \\ V_{C_2} \\ V_{C_3} \\ V_{out} \end{bmatrix} = \begin{bmatrix} 2 \\ 3 \\ 4 \\ 10 \end{bmatrix} \cdot V_{in}.$$

The topological switching states corresponding to the ideal conversion ratio of 9 are identical to those corresponding with conversion ratio 10, except during the fourth phase. For conversion ratio 9, all floating capacitors are connected in series to charge the output during phase four and the input voltage source is not connected.

Figures 8, 9:
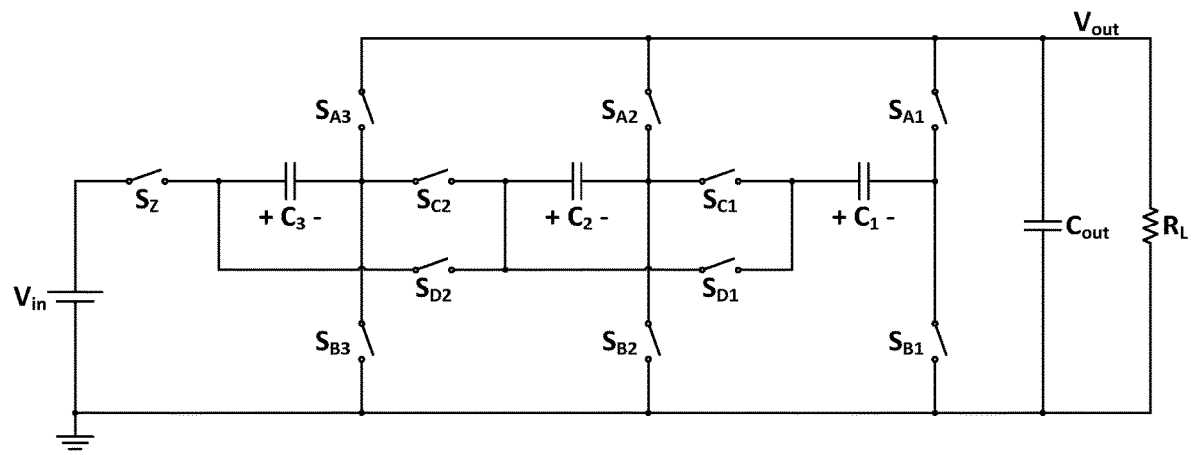
FIG. 8 is a circuit diagram of an embodiment of the high step-down ratio switched-capacitor DC-DC converter of the present invention utilizing three floating capacitors.
FIG. 9 is a table which lists the switching sequences for a set of attainable ideal conversion ratios for the converter in FIG. 8.
Figure 10A:
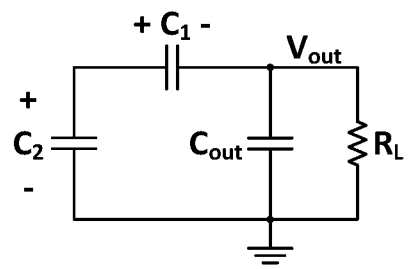
FIG. 10A through 10D show the topological switching states corresponding to the ideal conversion 1/10 for the converter in FIG. 8.
Figure 10B:
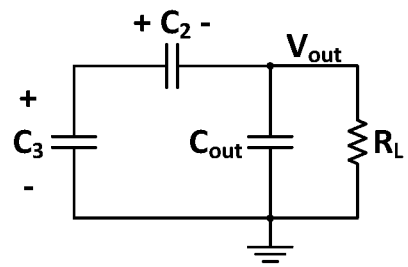
Figure 10C:
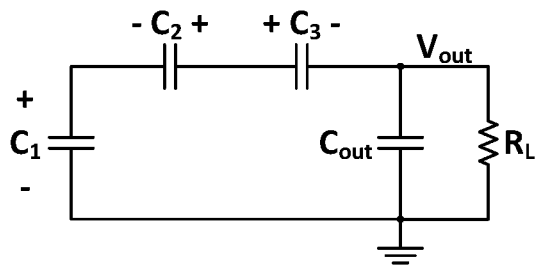
Figure 10D:
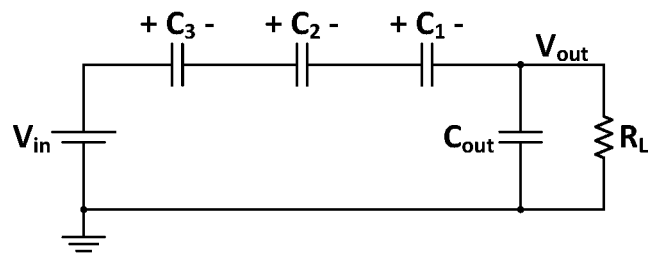

An embodiment of the high step-down ratio switched-capacitor DC-DC converter of the present invention, utilizing three floating capacitors is shown in FIG. 8. In this embodiment, the high-voltage terminals are connected to an input voltage source, $V_{in}$, and the low-voltage terminals are connected to an output capacitor, $C_{out}$, and an output load, $R_L$. A set of attainable ideal conversion ratios and their corresponding switching sequences are summarized in FIG. 9. The attainable conversion ratios include 1/9 and 1/10.

The topological switching states corresponding to the ideal conversion ratio of 1/10, for phase one through four, are illustrated in FIG. 10A through 10D. During phase one, capacitor $C_1$ and the output are connected in series and charged by capacitor $C_2$. During phase two, capacitor $C_2$ and the output are connected in series and charged by capacitor $C_3$. For phase three, capacitors $C_1$ and $C_2$ are connected in series and charge capacitor $C_3$ and the output. During the fourth phase, all floating capacitors are connected in series with the input voltage source and charge the output. If the converter is unloaded, the ideal capacitor voltages for this switching configuration are $$V_C = \begin{bmatrix} V_{C_1} \\ V_{C_2} \\ V_{C_3} \\ V_{out} \end{bmatrix} = \begin{bmatrix} 2/10 \\ 3/10 \\ 4/10 \\ 1/10 \end{bmatrix} \cdot V_{in}.$$

The topological switching states corresponding to the ideal conversion ratio of 1/9 are identical to those corresponding with conversion ratio 1/10, except during the fourth phase. For conversion ratio 1/9, all floating capacitors are connected in series and charged by the input voltage source during phase four and the output is not connected.

Figures 11, 12:
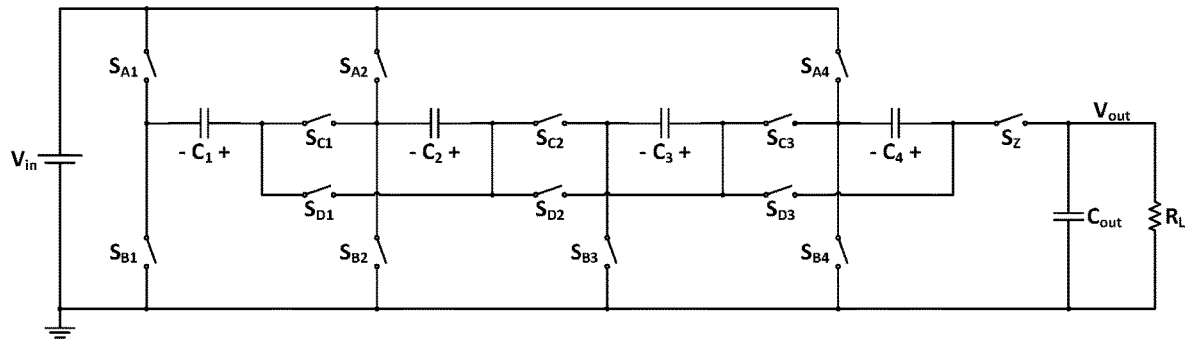
FIG. 11 is a circuit diagram of an embodiment of the high step-up ratio switched-capacitor DC-DC converter of the present invention utilizing four floating capacitors.
FIG. 12 is a table which lists the switching sequences for a set of attainable ideal conversion ratios for the converter in FIG. 11.
Figure 13A:
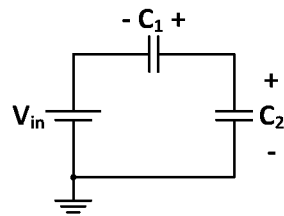
FIG. 13A through 13E show the topological switching states corresponding to the ideal conversion 22 for the converter in FIG. 11.
Figure 13B:
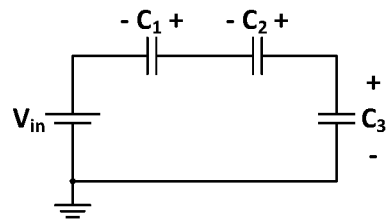
Figure 13C:
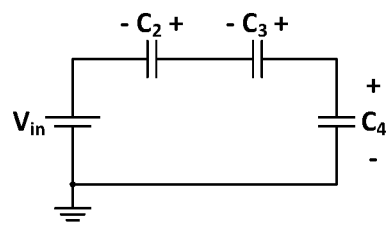
Figure 13D:
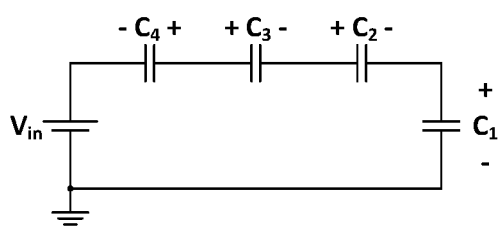
Figure 13E:
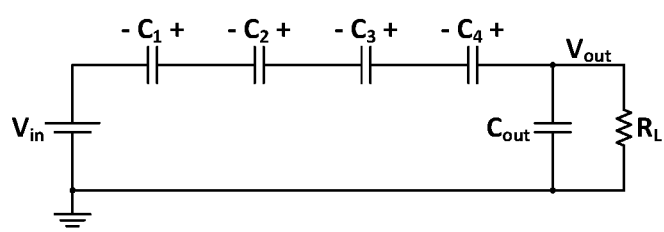

An embodiment of the high step-up ratio switched-capacitor DC-DC converter of the present invention, utilizing four floating capacitors and fourteen switches is shown in FIG. 11. The low-voltage terminals are connected to an input voltage source, $V_{in}$, and the high-voltage terminals are connected to an output capacitor, $C_{out}$, and an output load, $R_L$. A set of attainable step-up conversion ratios and their corresponding switching sequence are enumerated in FIG. 12. The attainable conversion ratios include 20, 21, and 22. By increasing the number of capacitors from three to four, the highest attainable step-up conversion ratio is increased from 10 to 22.

The topological switching states corresponding to the ideal conversion ratio of 22, for phase one through five, are illustrated in FIG. 13A through 13E. During phase one, the input voltage source and capacitors $C_1$ are connected in series and charge capacitor $C_2$. During phase two, the input voltage source and capacitors $C_1$ and $C_2$ are connected in series and charge capacitor $C_3$. For phase three, the input voltage source and capacitors $C_2$ and $C_3$ are connected in series and charge capacitor $C_4$. During phase four, the input voltage source and capacitor $C_4$ are connected in series and charge capacitors $C_1$, $C_2$, and $C_3$. During the fifth phase, all floating capacitors are connected in series with the input voltage source and charge the output. If the converter is unloaded, the ideal capacitor voltages for this switching configuration are $$V_C = \begin{bmatrix} V_{C_1} \\ V_{C_2} \\ V_{C_3} \\ V_{C_4} \\ V_{out} \end{bmatrix} = \begin{bmatrix} 2 \\ 3 \\ 6 \\ 10 \\ 22 \end{bmatrix} \cdot V_{in}.$$

Figures 14, 15:
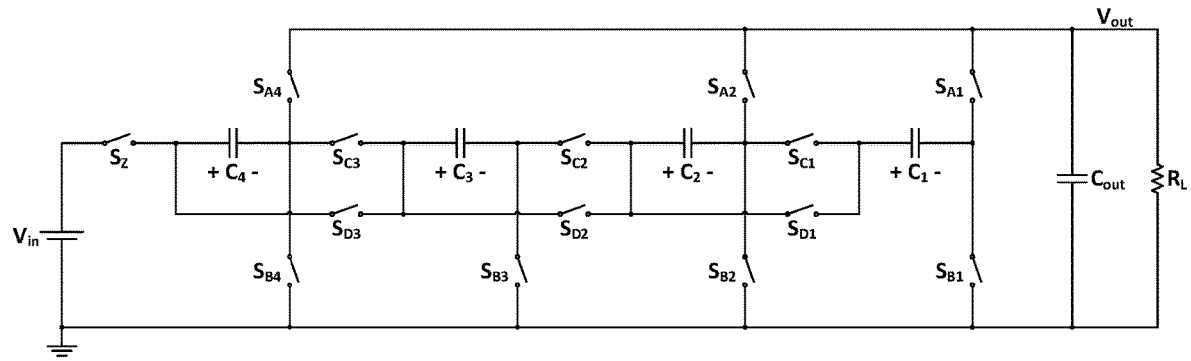
FIG. 14 is a circuit diagram of an embodiment of the high step-down ratio switched-capacitor DC-DC converter of the present invention utilizing four floating capacitors.
FIG. 15 is a table which lists the switching sequences for a set of attainable ideal conversion ratios for the converter in FIG. 14.
Figure 16A:
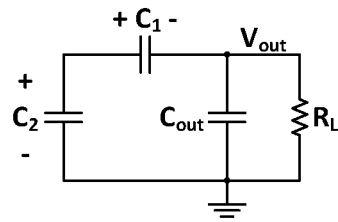
FIG. 16A through 16E show the topological switching states corresponding to the ideal conversion 1/22 for the converter in FIG. 14.
Figure 16B:
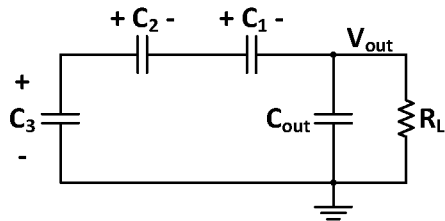
Figure 16C:
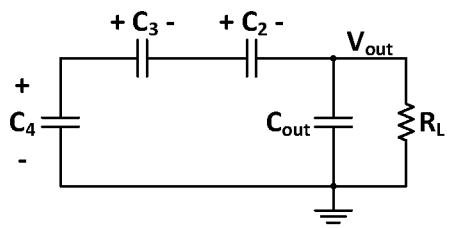
Figure 16D:
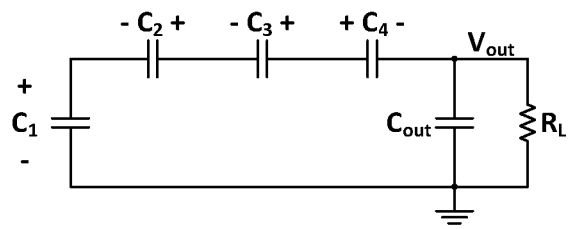
Figure 16E:
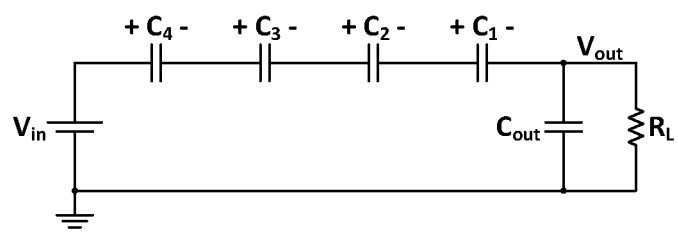

An embodiment of the high step-down ratio switched-capacitor DC-DC converter of the present invention, utilizing four floating capacitors and fourteen switches is shown in FIG. 14. The high-voltage terminals are connected to an input voltage source, $V_{in}$, and the low-voltage terminals are connected to an output capacitor, $C_{out}$, and an output load, $R_L$. A set of attainable step-down conversion ratios and their corresponding switching sequence are enumerated in FIG. 15. The attainable conversion ratios include 1/20, 1/21, and 1/22.

The topological switching states corresponding to the ideal conversion ratio of 1/22, for phase one through five, are illustrated in FIG. 16A through 16E. During phase one, capacitor $C_1$ and the output are connected in series and charged by capacitor $C_2$. During phase two, the output and capacitors $C_1$ and $C_2$ are connected in series and charged by capacitor $C_3$. For phase three, the output and capacitors $C_2$ and $C_3$ are connected in series and charged by capacitor $C_4$. During phase four, the output and capacitor $C_4$ are connected in series and charged by capacitors $C_1$, $C_2$, and $C_3$. During the fifth phase, all floating capacitors are connected in series with the input voltage source and charge the output. If the converter is unloaded, the ideal capacitor voltages for this switching configuration are $$V_C = \begin{bmatrix} V_{C_1} \\ V_{C_2} \\ V_{C_3} \\ V_{C_4} \\ V_{out} \end{bmatrix} = \begin{bmatrix} 2/22 \\ 3/22 \\ 6/22 \\ 10/22 \\ 1/22 \end{bmatrix} \cdot V_{in}.$$

It is understood that the invention is not limited in its application to the ideal conversion ratios and switching sequences enumerated in FIG. 6, FIG. 9, FIG. 12, and FIG. 15. The invention is capable of other embodiments or of being practiced and carried out in various ways. The conversion ratios depicted in said tables are considered ideal and it is understood by those skilled in the art, that the actual conversion ratio will deviate from this ratio when the circuit is loaded.

The switched-capacitor DC-DC converter of the present invention can dynamically vary its ideal conversion ratio by adjusting the switching sequence, i.e., which switches are turned on for each phase. The control circuit, depicted in FIG. 4, can be configured to sense the input voltage and/or output voltage and select the optimum attainable ideal conversion ratio, and its corresponding switching sequence, in order to maximize the efficiency. Thus the embodiment of the SC DC-DC converter of the present invention utilizing three floating capacitors can dynamically vary its conversion ratio from 10 to 9 and to various other conversion ratios, based on the operating conditions of the converter.

Additionally, the converter can regulate the output voltage or output current in the presence of variations in the input source and output load using feedback. The control circuit, depicted in FIG. 4, can be configured to sense the output and compare it to a desired reference value. The difference between these two values, or the error, is minimized by a controller through a control variable. The output of the converter is known to depend on the duration of each switching state (duty cycle) and the switching frequency of the converter. In some embodiments of the invention, the output can therefore by stabilized by varying the duty cycle and/or frequency of the switch gating signals.

Although selected embodiments of the present invention have been presented and described, it is to be understood the present invention is not limited to the described embodiments. Instead, it is to be appreciated by those that are skilled in the art that changes may be made to these embodiments without departing from the principles and spirit of the invention, the scope of which is defined by the claims and the equivalents thereof.

What is claimed is:

1. A DC-DC converter comprising:
    a low-voltage side, having a positive terminal and a negative terminal, and a high-voltage side, having a positive terminal and a negative terminal;
    a plurality of N capacitors comprising a first through $N^{th}$ capacitor, each having a positive terminal and a negative terminal, wherein N is at least three;
    a first plurality of switches comprising a switch coupled between the negative terminal of said first capacitor and the positive terminal of said low-voltage side, a switch coupled between the negative terminal of said second capacitor and the positive terminal of said low-voltage side, and a switch coupled between the negative terminal of said $N^{th}$ capacitor and the positive terminal of said low-voltage side;
    a second plurality of switches comprising a switch coupled between the negative terminal of said $i^{th}$ capacitor and the negative terminals of said low-voltage side and said high-voltage side, wherein i is a natural number less than or equal to N;
    a third plurality of switches comprising a switch coupled between the positive terminal of said $k^{th}$ capacitor and the negative terminal of said $(k+1)^{th}$ capacitor, wherein k is a natural number less than N;
    a fourth plurality of switches comprising a switch coupled between the positive terminal of said $k^{th}$ capacitor and the positive terminal of said $(k+1)^{th}$ capacitor, wherein k is a natural number less than N;
    a switch coupled between the positive terminal of said $N^{th}$ capacitor and the positive terminal of said high-voltage side; and
    a control circuit configured to open and close said plurality of switches such that the converter cycles through a plurality of topological states.

2. The converter of claim 1 wherein the positive and negative terminals of said low-voltage side are connected to an input energy source and the positive and negative terminals of said high-voltage side are connected to an output load.

3. The converter of claim 1 wherein the positive and negative terminals of said high-voltage side are connected to an input energy source and the positive and negative terminals of said low-voltage side are connected to an output load.

4. The converter of claim 1 wherein said first plurality of switches further includes a switch coupled between the positive terminal of said $m^{th}$ capacitor and the positive terminal of said low-voltage side, wherein m is a natural number greater than two and less than N.

5. The converter of claim 1 further comprising at least one additional capacitor coupled to the positive and negative terminals of said high-voltage side.

6. The converter of claim 1 further comprising at least one additional capacitor coupled to the positive and negative terminals of said low-voltage side.

7. The converter of claim 1 wherein said control circuit is configured to vary the ideal conversion ratio during operation of said converter.

8. The converter of claim 1 wherein said control circuit is configured to regulate the output at a desired output voltage or output current during operation of said converter.

9. A DC-DC converter comprising:
    a low-voltage side and a high-voltage side, each having a positive terminal and a negative terminal;
    a first capacitor, a second capacitor, and a third capacitor;
    a plurality of switches;
    a control circuit configured to open and close said plurality of switches, such that the converter cycles through a plurality of topological states comprising:
        a first state wherein said first capacitor and said second capacitor are connected in series between the positive terminal of said low-voltage side and the negative terminal of said low-voltage side;
        a second state wherein said second capacitor and said third capacitor are connected in series between the positive terminal of said low-voltage side and the negative terminal of said low-voltage side;
        a third state wherein said first capacitor, said second capacitor, and said third capacitor are connected in series between the positive terminal of said low-voltage side and the negative terminal of said low-voltage side; and
        a fourth state.

10. The converter of claim 9 wherein the positive and negative terminals of said low-voltage side are connected to an input energy source and the positive and negative terminals of said high-voltage side are connected to an output load.

11. The converter of claim 9 wherein the positive and negative terminals of said high-voltage side are connected to an input energy source and the positive and negative terminals of said low-voltage side are connected to an output load.

12. The converter of claim 9 wherein said fourth state is comprised of said first capacitor, said second capacitor, and said third capacitor connected in series between the positive terminal of said low-voltage side and the positive terminal of said high-voltage side.

13. The converter of claim 9 further comprising at least one additional capacitor coupled to the positive and negative terminals of said high-voltage side.

14. The converter of claim 9 further comprising at least one additional capacitor coupled to the positive and negative terminals of said low-voltage side.

15. A DC-DC converter comprising:
- a low-voltage side and a high-voltage side, each having a positive terminal and a negative terminal;
- a first capacitor, a second capacitor, a third capacitor, and a fourth capacitor;
- a plurality of switches;
- a control circuit configured to open and close said plurality of switches, such that the converter cycles through a plurality of topological states comprising:
  - a first state wherein said first capacitor and said second capacitor are connected in series between the positive terminal of said low-voltage side and the negative terminal of said low-voltage side;
  - a second state wherein said first capacitor, said second capacitor, and said third capacitor are connected in series between the positive terminal of said low-voltage side and the negative terminal of said low-voltage side;
  - a third state wherein said second capacitor, said third capacitor, and said fourth capacitor are connected in series between the positive terminal of said low-voltage side and the negative terminal of said low-voltage side
  - a fourth state wherein said first capacitor, said second capacitor, said third capacitor, and said fourth capacitor are connected in series between the positive terminal of said low-voltage side and the negative terminal of said low-voltage side; and
  - a fifth state.

16. The converter of claim 15 wherein the positive and negative terminals of said low-voltage side are connected to an input energy source and the positive and negative terminals of said high-voltage side are connected to an output load.

17. The converter of claim 15 wherein the positive and negative terminals of said high-voltage side are connected to an input energy source and the positive and negative terminals of said low-voltage side are connected to an output load.

18. The converter of claim 15 wherein said fifth state is comprised of said first capacitor, said second capacitor, said third capacitor, and said fourth capacitor connected in series between the positive terminal of said low-voltage side and the positive terminal of said high-voltage side.

19. The converter of claim 15 further comprising at least one additional capacitor coupled to the positive and negative terminals of said high-voltage side.

20. The converter of claim 15 further comprising at least one additional capacitor coupled to the positive and negative terminals of said low-voltage side.

* * * * *